US009883010B2

(12) United States Patent
Han et al.

(10) Patent No.: US 9,883,010 B2
(45) Date of Patent: Jan. 30, 2018

(54) METHOD, APPARATUS, DEVICE AND SYSTEM FOR GENERATING DHCP SNOOPING BINDING TABLE

(71) Applicant: Huawei Technologies Co., Ltd., Shenzhen (CN)

(72) Inventors: Zhichong Han, Nanjing (CN); Bin Yu, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 938 days.

(21) Appl. No.: 14/272,613

(22) Filed: May 8, 2014

(65) Prior Publication Data

US 2014/0244733 A1    Aug. 28, 2014

Related U.S. Application Data

(63) Continuation of application No. PCT/CN2012/075059, filed on May 4, 2012.

(30) Foreign Application Priority Data

Nov. 16, 2011 (CN) .......................... 2011 1 0362774

(51) Int. Cl.
*G06F 15/173* (2006.01)
*G06F 15/16* (2006.01)
(Continued)

(52) U.S. Cl.
CPC .............. *H04L 67/42* (2013.01); *H04L 43/08* (2013.01); *H04L 61/103* (2013.01);
(Continued)

(58) Field of Classification Search
CPC .......................... H04L 63/0876; H04L 63/162
(Continued)

(56) References Cited

U.S. PATENT DOCUMENTS

2008/0095114 A1* 4/2008 Dutta .................... H04W 12/06
                                                                  370/331
2008/0165778 A1    7/2008 Ertemalp
(Continued)

FOREIGN PATENT DOCUMENTS

CN         101039176 A       9/2007
CN         101150582 A       3/2008
(Continued)

OTHER PUBLICATIONS

Woundy, R., et al., "Dynamic Host Configuration Protocol (DHCP) Leasequery," RFC 4388, Feb. 2006, 27 pages.
(Continued)

*Primary Examiner* — Karen Tang
(74) *Attorney, Agent, or Firm* — Conley Rose, P.C.

(57) ABSTRACT

A method, an apparatus, a device, and a system for generating a Dynamic Host Configuration Protocol snooping (DHCP) Snooping binding table. The method includes: constructing a request packet for obtaining information about a DHCP client, and sending the request packet to a DHCP server; receiving a response packet corresponding to the request packet, and extracting the information about the client from the response packet, where the information about the client includes the client's Internet Protocol (IP) address and Media Access Control (MAC) address; and obtaining the client's virtual local area network (VLAN) number and ingress port number through the MAC address, and generating the DHCP Snooping binding table. The technical solutions solve the problem that traffic of some clients is lost due to a lack of a DHCP Snooping binding table of these clients in a process of enabling DHCP Snooping.

8 Claims, 4 Drawing Sheets

(51) Int. Cl.
*H04L 29/06* (2006.01)
*H04L 29/12* (2006.01)
*H04L 12/26* (2006.01)

(52) U.S. Cl.
CPC ...... *H04L 61/2015* (2013.01); *H04L 63/1483* (2013.01); *H04L 63/0876* (2013.01); *H04L 63/162* (2013.01)

(58) Field of Classification Search
USPC .................................................. 709/224, 231
See application file for complete search history.

(56) References Cited

U.S. PATENT DOCUMENTS

| | | | | |
|---|---|---|---|---|
| 2008/0247399 | A1* | 10/2008 | Hazard | H04L 45/02 370/395.31 |
| 2010/0191839 | A1* | 7/2010 | Gandhewar | H04L 29/12028 709/220 |
| 2010/0278183 | A1 | 11/2010 | Gu et al. | |
| 2010/0287266 | A1* | 11/2010 | Asati | H04L 12/4641 709/222 |
| 2010/0293250 | A1* | 11/2010 | Ankaiah | H04L 12/56 709/219 |
| 2010/0293257 | A1* | 11/2010 | Kinnear, Jr. | H04L 29/12301 709/221 |
| 2011/0038377 | A1* | 2/2011 | Haddad | H04L 69/16 370/395.53 |
| 2011/0080842 | A1* | 4/2011 | Zheng | H04L 12/2863 370/252 |
| 2013/0311991 | A1* | 11/2013 | Li | H04L 61/103 718/1 |
| 2017/0161091 | A1* | 6/2017 | Li | G06F 9/45558 |

FOREIGN PATENT DOCUMENTS

| | | |
|---|---|---|
| CN | 101227407 A | 7/2008 |
| CN | 102413044 A | 4/2012 |

OTHER PUBLICATIONS

Foreign Communication From a Counterpart Application, European Application No. 12792507.1, Extended European Search Report dated Feb. 25, 2015, 5 pages.
Partial English Translation and Abstract of Chinese Patent Application No. CN101150582A, dated Jun. 20, 2014, 4 pages.
Droms, R., "Dynamic Host Configuration Protocol," RFC 2131, Mar. 1997, 48 pages.
Alexander, S., et al., "DHCP Options and BOOTP Vendor Extensions," RFC 2132, Mar. 1997, 36 pages.
Foreign Communication From a Counterpart Application, PCT Application No. PCT/CN2012/075059, International Search Report dated Aug. 16, 2012, 2 pages.
Foreign Communication From a Counterpart Application, PCT Application No. PCT/CN2012/075059, Written Opinion dated Aug. 16, 2012, 12 pages.

* cited by examiner

METHOD, APPARATUS, DEVICE AND SYSTEM FOR GENERATING DHCP SNOOPING BINDING TABLE

CROSS-REFERENCE TO RELATED APPLICATIONS

This application is a continuation of International Application No. PCT/CN2012/075059, filed on May 4, 2012, which claims priority to Chinese Patent Application No. 201110362774.5, filed on Nov. 16, 2011, both of which are hereby incorporated by reference in their entireties.

TECHNICAL FIELD

Embodiments of the present invention relate to the field of communications technologies, and in particular, to a method, a system, and a device for generating a Dynamic Host Configuration Protocol (DHCP) snooping binding table.

BACKGROUND

The DHCP snooping technology is a DHCP security feature, where a DHCP Snooping binding table is established and maintained by monitoring DHCP packets between a DHCP client and a DHCP server, and during packet forwarding, the binding table is used to check Address Resolution Protocol (ARP) packets and Internet Protocol (IP) packets and filter unauthorized packets, thereby implementing a network security function. A DHCP Snooping binding table includes such information as a client's IP address, Media Access Control (MAC) address, ingress port number, and virtual local area network (Virtual LAN or VLAN) number. After a DHCP Snooping function is enabled, a network device obtains a client's IP address, MAC address, ingress port number, and VLAN number according to exchanged DHCP packets between the client and the server, and further forms a DHCP Snooping binding table. The binding table works with an ARP detection function to achieve a purpose of controlling network access of a client.

In the prior art, the DHCP Snooping function is enabled by configuring a command after the network device starts to operate. After the DHCP Snooping function is enabled, a DHCP Snooping binding table is generated according to the snooped exchanged DHCP packets, and information required for generating the binding table can be obtained only from exchanged DHCP packets for initially establishing a connection between a DHCP client and the DHCP server. If connections between some DHCP clients and the DHCP server have already been established and then the DHCP Snooping function is enabled, the information required for establishing a DHCP Snooping table cannot be obtained, and a DHCP Snooping binding table cannot be generated for these clients. This may cause a lack of a DHCP Snooping binding table of these clients. As no definite chronological dependency exists between enabling the DHCP Snooping function by using a command line and establishing a connection between a DHCP client and the DHCP server, some clients may have established connections with the DHCP server before the DHCP Snooping function is enabled. Data packets sent by these clients may fail the DHCP Snooping detection and be discarded because no DHCP Snooping binding table is generated for them. These clients need to re-establish an exchange relationship with the DHCP server, and this process may lead to loss of their traffic.

SUMMARY

Embodiments of the present invention provide a method, a system, and a device for generating a DHCP Snooping binding table to solve the problem that traffic of some clients is lost due to a lack of a part of a DHCP Snooping binding table in a process of enabling DHCP Snooping on a network device.

To achieve the purpose, an embodiment of the present invention provides a method for generating a DHCP Snooping binding table, including: constructing a request packet for obtaining information about a DHCP client, and sending the request packet to a DHCP server; receiving, from the DHCP server, a response packet corresponding to the request packet, and extracting the information about the client from the response packet, where the information about the client includes the client's Internet Protocol (IP) address and Media Access Control (MAC) address; and obtaining the client's virtual local area network VLAN number and ingress port number by looking up a MAC table by using the MAC address, and generating the DHCP Snooping binding table according to the client's IP address, MAC address, VLAN number, and ingress port number.

An embodiment of the present invention provides an apparatus for generating a DHCP Snooping binding table, including: a packet sending unit configured to construct a request packet for obtaining information about a DHCP client and send the request packet to a DHCP server; a packet receiving unit configured to receive, from the DHCP server, a response packet corresponding to the request packet and extract the information about the client from the response packet, where the information about the client includes the client's IP address and MAC address; and a packet processing unit configured to obtain the client's virtual local area network VLAN number and ingress port number by looking up a MAC table by using the MAC address and generate the DHCP Snooping binding table according to the client's IP address, MAC address, VLAN number, and ingress port number.

An embodiment of the present invention provides a network device. The network device includes an apparatus for generating a DHCP Snooping binding table according to an embodiment of the present invention.

An embodiment of the present invention provides a system for generating a Dynamic Host Configuration Protocol snooping DHCP Snooping binding table. A network device and a DHCP server that performs information exchange with the network device are included, where the network device is configured to construct a request packet for obtaining information about a DHCP client, send the request packet to the DHCP server, receive, from the DHCP server, a response packet corresponding to the request packet, extract the information about the client from the response packet, where the information about the client includes the client's IP address and MAC address, and generate the DHCP Snooping binding table according to the information about the client; and where the DHCP server is configured to receive the request packet, construct the response packet of the request packet, where the response packet includes the information about the DHCP client.

In summary, the embodiments of the present invention propose a method, an apparatus, a device, and a system for generating a DHCP Snooping binding table. In a process of enabling DHCP Snooping, the DHCP Snooping binding table is generated according to information about a DHCP client obtained from a DHCP server, and the DHCP Snooping binding table provides necessary information support to implement the DHCP Snooping function. The embodiments of the present invention allow the DHCP snooping function of a network device to be enabled in real time under the condition that traffic of current client runs properly.

BRIEF DESCRIPTION OF DRAWINGS

To illustrate the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the embodiments of the present invention more comprehensible, the following clearly describes the technical solutions in the embodiments of the present invention with reference to the accompanying drawings in the embodiments of the present invention. The described embodiments are merely a part rather than all of the embodiments of the present invention. All other embodiments obtained by a person of ordinary skill in the art based on the embodiments of the present invention without creative efforts shall fall within the protection scope of the present invention.

Embodiment 1

The embodiment of the present invention provides a method for generating a DHCP Snooping binding table.

Figure 1:
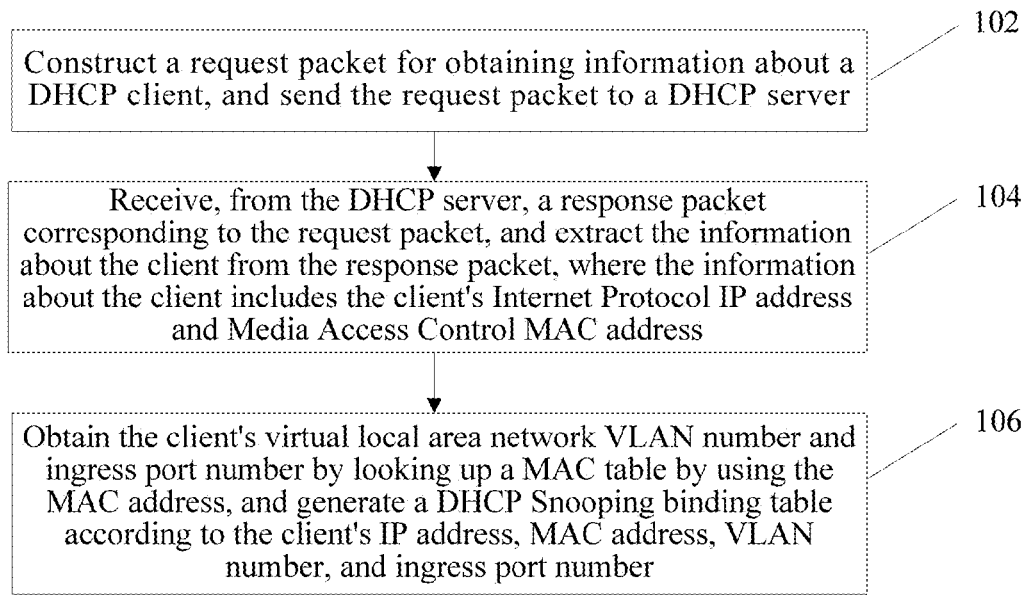
FIG. 1 is a schematic flowchart of a method for generating a DHCP Snooping binding table according to a first embodiment of the present invention.

Referring to FIG. 1, FIG. 1 is a flowchart of a method according to the embodiment of the present invention. The method includes:

102. Construct a request packet for obtaining information about a DHCP client, and send the request packet to a DHCP server.

After a DHCP Snooping function is enabled by using a command line, a network device establishes a DHCP Snooping binding table by snooping DHCP packets by a DHCP Snooping protocol. An entry in the binding table includes the client's IP address, MAC address, ingress port number, and VLAN number. For example, as shown in Table 1, a MAC address and an IP address of a client A are A and 10.1.1.1 respectively and a MAC address and an IP address of a client B are B and 10.1.1.2 respectively, the DHCP Snooping function is enabled on the network device by using the command line, and the network device snoops DHCP packets in a process where the clients A and B interact with the DHCP server, and establishes, by analyzing the exchanged DHCP packets, the DHCP Snooping binding table, as shown below:

TABLE 1

| DHCP Snooping binding table | | | |
| --- | --- | --- | --- |
| MAC Address | IP Address | Ingress Port Number | VLAN Number |
| A | 10.1.1.1 | E1 | 1 |
| B | 10.1.1.2 | E2 | 2 |

Figure 2:
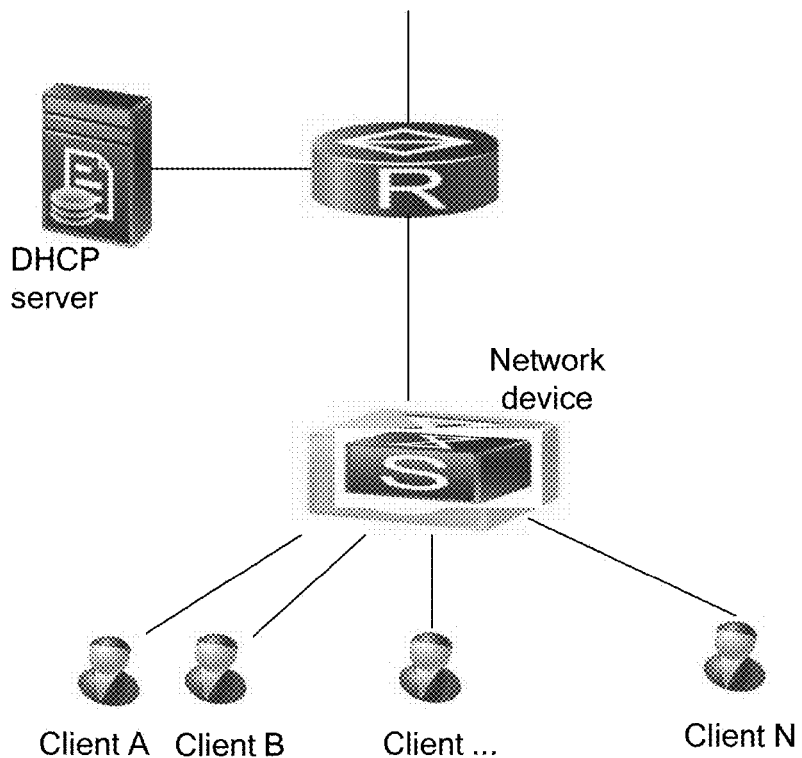
FIG. 2 is a schematic diagram showing how to generate a DHCP Snooping binding table in the prior art.

During packet forwarding, the DHCP Snooping binding table is used to check the client's packets, and discard processing is performed on packets that do not match the binding table, thereby solving a network security problem. As the DHCP Snooping binding table currently can be generated only in a process where the client is establishing a connection with the DHCP server, if some clients have established connections with the DHCP server before the network device enables the DHCP Snooping function by using the command line, as shown in FIG. 2, given that a client N has established a connection with the DHCP server before the network device enables the DHCP function by using a command line, DHCP Snooping cannot generate a DHCP Snooping binding table for the client N, and after the network device enables the DHCP Snooping function, data packets sent by the client N will fail DHCP Snooping detection and be discarded. To solve the problem, the inventor of the present invention discovers upon research that, before the network device enables DHCP Snooping, information about clients that have established connections with the DHCP server is completely stored in the DHCP server, and therefore, the information about these clients may be acquired from the DHCP server in a manner of constructing a request packet, and a DHCP Snooping binding table may be further established for these clients to ensure continuity of traffic of these clients.

Figure 3:
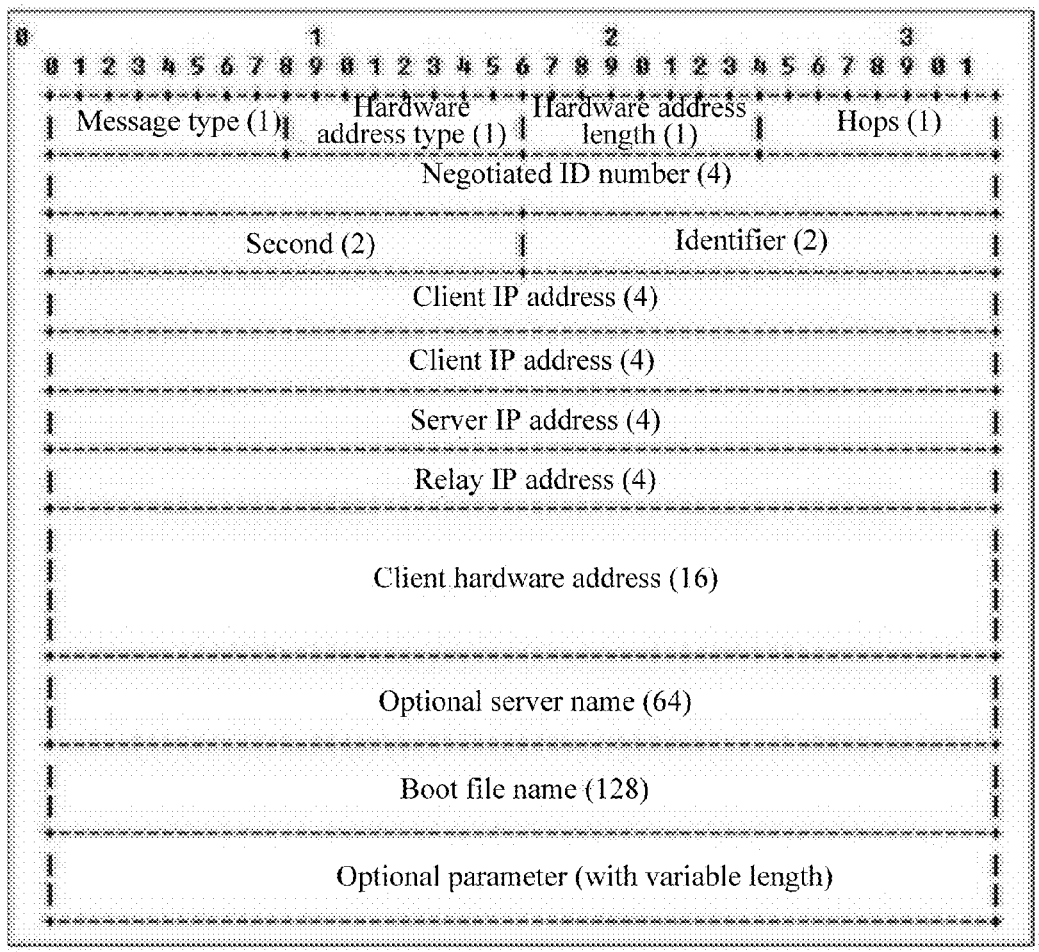
FIG. 3 is a schematic diagram of a format of an exchanged packet between a DHCP client and a DHCP server in the prior art.
Figure 4:
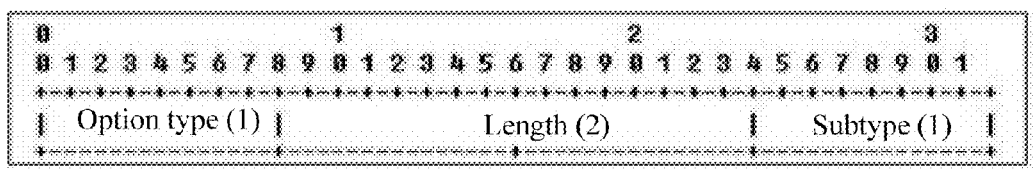
FIG. 4 is a schematic diagram of a format of an option Options part of an extended DHCP Inform packet according to a first embodiment of the present invention.

The request packet for obtaining the information about the DHCP client is sent to the DHCP server through a simulated client, and a default destination address of the packet is set to 0XFFFFFFFF. The request packet is sent to all DHCP servers in a manner of broadcasting. When a DHCP Relay is configured on the network device, the destination address of the request packet may be a DHCP server address configured on the DHCP Relay. In this way, the request packet can be sent only to a DHCP server that directly interacts with the network device. The request packet may be an extended DHCP Inform packet. In the extension of the DHCP Inform packet, an option part of the DHCP Inform packet is extended. A format of the DHCP Inform packet message is shown in FIG. 3. FIG. 3 shows a format of an exchanged packet between the DHCP client and the DHCP server, where a value of an option (op) field is 1 and a type of the packet is identified as DHCP Inform. As shown in FIG. 4, a format of an Options of the extended DHCP Inform packet may include:

1) option type: used to identify the exchanged request and response packets in the embodiment of the present invention. This field is 1 byte long and may be set to any value ranging from 128 to 255. It is preferably set to 206 in the embodiment of the present invention.

2) length: identifying the length of information data in a data field. This field is 2 bytes long and is set to 1, which identifies that information data in the data field is 1 byte long, where the data field is a subtype of 1 byte.

3) subtype: a field used to identify the type of the packet. This field is 1 byte long and set to any value ranging from 1 to 255. It is preferably set to 1 in the embodiment of the present invention, which is used to identify that the DHCP Inform packet is the request packet used to obtain information about the DHCP client.

104. Receive, from the DHCP server, a response packet corresponding to the request packet, and extract the information about the client from the response packet, where the information about the client includes the client's IP address and MAC address.

Figures 5, 6:
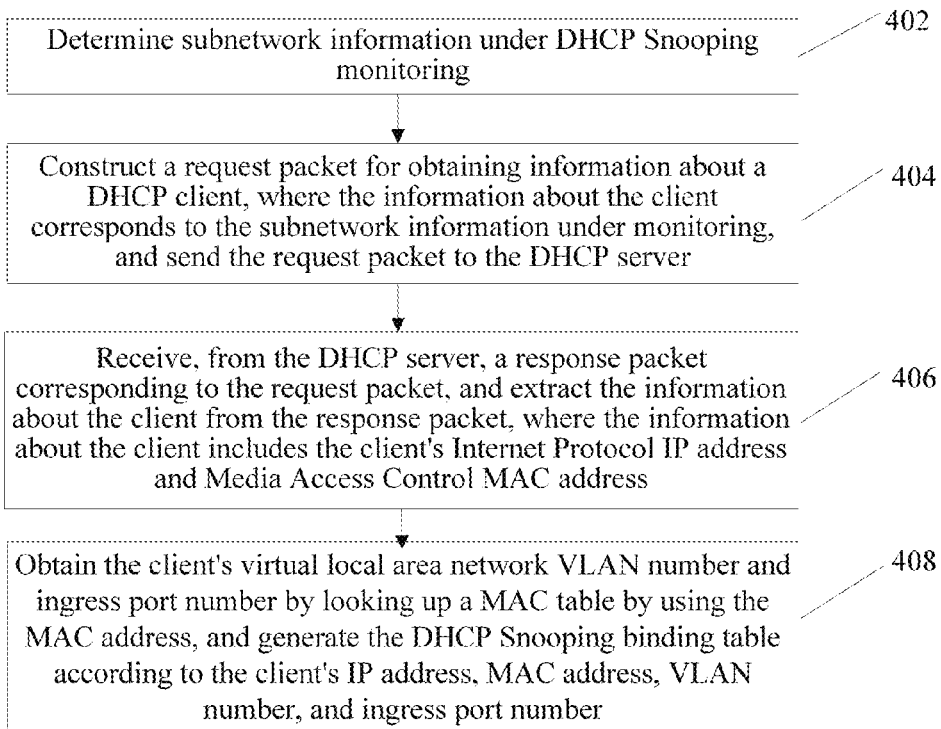
FIG. 5 is a schematic diagram of a format of an option Options part of an extended DHCPACK packet according to an embodiment of the present invention.
FIG. 6 is a schematic flowchart showing how to generate and deliver a DHCP Snooping binding entry according to a second embodiment of the present invention.

The response packet may be an extended DHCPACK packet. As the DHCP server stores information about the DHCP client when the DHCP client is establishing a connection with the DHCP server, the DHCP server may add the stored information about the client to the extended DHCPACK response packet. A format of the DHCPACK packet is shown in FIG. 3. FIG. 3 shows a format of an exchanged packet between the DHCP client and the DHCP server, where the value of an option (op) field is 2 and a type of the packet is identified as a DHCPACK packet. As shown in FIG. 5, a format of an Options option of the extended DHCPACK packet may include:

1) option type: used to identify the exchanged request and response packets in the embodiment of the present invention. This field is 1 byte long and may be set to any value ranging from 128 to 255. It is preferably set to 206 in the embodiment of the present invention.

2) length: identifying the length of information data in a data field. This field is 2 bytes long and is set to 10*N+1, which identifies that the information data in the data field is 10*N+1 bytes long, where 10 is the sum of the length of the client's IP address and that of the client's MAC address, and N identifies the number of clients.

3) subtype: a field used to identify the type of the packet. This field is 1 byte long and set to any value ranging from 1 to 255. For the purpose of distinguishing from the type of the request packet, this field is preferably set to 2 in the embodiment of the present invention, which is used to identify that the DHCPACK packet is the response packet corresponding to the request packet.

4) IP address of the client A (ip_address_A): used to identify an IP address of the client A. This field is 4 bytes long.

5) MAC address of the client A (mac_address_A): used to identify a MAC address of the client A. This field is 6 bytes long.

6) IP address of the client N (ip_address_N): used to identify an IP address of the client N. This field is 4 bytes long.

7) MAC address of the client N (mac_address_N): used to identify a MAC address of the client N. This field is 6 bytes long.

It is determined by receiving and parsing the response packet sent by the DHCP server that the value of the subtype is 2, and then the packet is considered as a response packet that is returned by the DHCP and includes the information about the client. The information about the client may be obtained by parsing the packet. The information about the client includes the client's IP address and MAC address, where the IP address and the MAC address are key fields for generating the DHCP Snooping binding table.

106. Obtain the client's virtual local area network VLAN number and ingress port number by looking up a MAC table by using the MAC address, and generate the DHCP Snooping binding table according to the client's IP address, MAC address, VLAN number, and ingress port number.

The client's ingress port number and VLAN number may be obtained by further looking up the MAC address table by using the MAC information of the client obtained in step 104, and all information required for generating the DHCP Snooping binding table is further obtained. The MAC address table is a layer-2 forwarding table, where information such as the client's ingress port number and VLAN number is included. The DHCP Snooping binding table can be generated according to the obtained IP address, MAC address, ingress port number, and VLAN number of the client.

It can be seen that according to the method provided in the embodiment of the present invention, a DHCP Snooping binding table may be generated for a client that has established a connection with a DHCP server before DHCP Snooping is enabled, thereby solving the problem that traffic of some clients is lost due to a lack of a DHCP Snooping binding table of these clients in a process of enabling DHCP Snooping.

Embodiment 2

The embodiment of the present invention provides a method for generating a DHCP Snooping binding table. Referring to FIG. 6, FIG. 6 is a flowchart of the method according to the embodiment of the present invention. Compared with Embodiment 1, the embodiment of the present invention further adds a step of setting subnetwork information under DHCP Snooping monitoring prior to step 102 in Embodiment 1, so that a network device may acquire information about clients under DHCP Snooping monitoring from a DHCP server in a more accurate way. The embodiment of the present invention includes:

402. Determine the subnetwork information under DHCP Snooping monitoring.

Before enabling a DHCP Snooping function by using a command line, the network device may further set the subnetwork information under DHCP Snooping monitoring, where subnetwork information being monitored may be negotiated in advance with the DHCP server, and the DHCP server assigns only an address within the subnetwork being monitored to the network device.

404. Construct a request packet for obtaining information about a DHCP client, where the information about the client corresponds to the subnetwork information being monitored, and send the request packet to the DHCP server.

Figure 7:
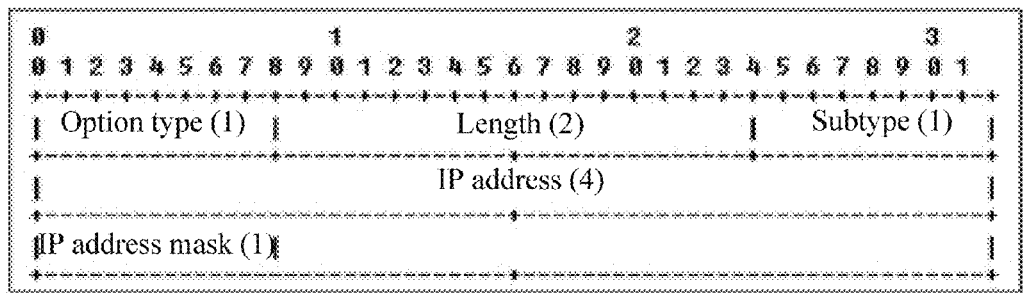
FIG. 7 is a schematic diagram of a format of an option Options part of an extended DHCP Inform packet according to the second embodiment of the present invention.

A default destination address of the request packet for obtaining the information about the DHCP client is set to 0XFFFFFFFF. The request packet is sent to all DHCP servers in a manner of broadcasting. When a DHCP Relay is configured on the network device, the destination address of the request packet may be a DHCP server address configured on the DHCP Relay. In this way, the request packet can be sent only to a DHCP server that directly interacts with the network device. The request packet may be an extension of DHCP Inform. The packet is sent to the DHCP server through a simulated client. In the extension to the DHCP Inform packet, an option Options part of the packet is extended, which indicates that the packet is a packet requesting to obtain the information about the client. A format of the DHCP Inform packet message is shown in FIG. 3, where a value of an option op field is 1, and a type of the packet is identified as DHCP inform. As shown in FIG. 7, a format of an Options option of an extended DHCP Inform request packet may include:

1) option type: used to identify the exchanged request and response packets in the embodiment of the present invention. This field is 1 byte long and may be set to any value ranging from 128 to 255. It is preferably set to 206 in the embodiment of the present invention.

2) length: identifying the length of information data in a data field. This field is 2 bytes long and is set to 6, which indicates that information data in the data field is 6 bytes long including a 1-byte subtype, a 4-byte address (ip) of the subnetwork being monitored, and a 1-byte address mask (ip_mask) of the subnetwork being monitored.

3) subtype: a field used to identify the type of the packet. This field is 1 byte long and set to any value ranging from 1 to 255. It is preferably set to 1 in the embodiment of the present invention, which is used to identify that the DHCP Inform packet is the request packet used to obtain information about the DHCP client.

4) address of the subnetwork being monitored (ip): used to identify the subnetwork address under DHCP Snooping monitoring. This field is 4 bytes long.

5) address mask of the subnetwork being monitored (ip_mask): used to identify the length of the address ip mask of the subnetwork being monitored. This field is 1 byte long.

The request packet that includes the subnetwork information under DHCP Snooping monitoring is sent, so that the network device may acquire the information about clients under DHCP Snooping monitoring from the DHCP server in a more accurate way, thereby avoiding storage of a redundant DHCP Snooping binding table.

406. Receive, from the DHCP server, a response packet corresponding to the request packet, and extract the information about the client from the response packet, where the information about the client includes the client's IP address and MAC address.

The response packet received from the DHCP server is generated by extending a DHCPACK packet by the DHCP server. A format of the DHCPACK packet is shown in FIG. 3, where a value of an option op field is 2, and a type of the packet is identified as the DHCPACK packet. As shown in FIG. 5, a format of an Options option of the extended DHCPACK packet may include:

1) option type: used to identify the exchanged request and response packets in the embodiment of the present invention. This field is 1 byte long and may be set to any value ranging from 128 to 255. It is preferably set to 206 in the embodiment of the present invention.

2) length: identifying the length of information data in a data field. This field is 2 bytes long and is set to 10*N+1, which identifies that the information data in the data field is 10*N+1 bytes long, where 10 is the sum of the length of the client's IP address and that of the client's MAC address, and N identifies the number of clients.

3) subtype: a field used to identify the type of the packet. This field is 1 byte long and set to any value ranging from 1 to 255. For the purpose of distinguishing from the type of the request packet, this field is preferably set to 2 in the embodiment of the present invention, which is used to identify that the DHCPACK packet is the response packet corresponding to the request packet.

4) IP address of a client A (ip_address_A): used to identify an IP address of the client A. This field is 4 bytes long.

5) MAC address of the client A (mac_address_A): used to identify a MAC address of the client A. This field is 6 bytes long.

6) IP address of a client N (ip_address_N): used to identify an IP address of the client N. This field is 4 bytes long.

7) MAC address of the client N (mac_address_N): used to identify a MAC address of the client N. This field is 6 bytes long.

The DHCP server may obtain the client's subnetwork information by parsing the request packet. The information about the client includes the client's IP address and MAC address, where the IP address and the MAC address are key entries in the DHCP Snooping binding table.

408. Obtain the client's virtual local area network VLAN number and ingress port number by looking up a MAC table by using the MAC address, and generate the DHCP Snooping binding table according to the client's IP address, MAC address, VLAN number, and ingress port number.

The client's ingress port number and VLAN number may be obtained by further looking up a MAC address table according to the client's MAC information obtained in step 406, thereby obtaining all information required for generating the DHCP Snooping binding table. The client's DHCP Snooping binding table is generated according to the obtained IP address, MAC address, ingress port number, and VLAN number of the client.

It can be seen that according to the method provided in the embodiment of the present invention, a DHCP Snooping binding table may be generated for a client that has established a connection with a DHCP server before DHCP Snooping is enabled, thereby solving the problem that traffic of some clients is lost due to a lack of a DHCP Snooping binding table of these clients in a process of enabling DHCP Snooping. Meanwhile, compared with Embodiment 1, this embodiment can obtain information about clients under DHCP Snooping monitoring from a DHCP server in a more accurate way, thereby avoiding storage of redundant client information.

Embodiment 3

Figure 8:
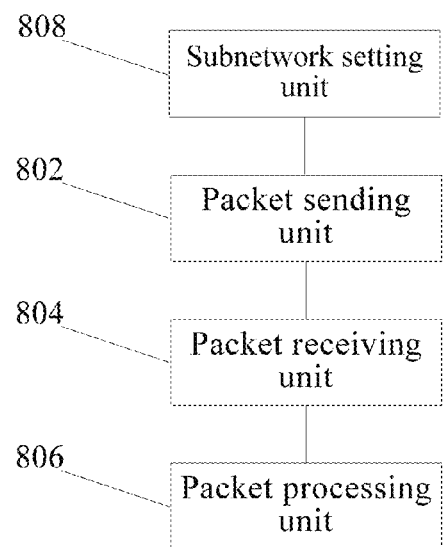
FIG. 8 is a schematic diagram of an apparatus for generating a DHCP Snooping binding entry according to a third embodiment of the present invention.

The embodiment of the present invention provides an apparatus for generating a DHCP Snooping entry. Referring to FIG. 8, FIG. 8 is a schematic diagram of the apparatus according to the embodiment of the present invention. The apparatus preferably includes a packet sending unit 802, a packet receiving unit 804, and a packet processing unit 806.

The packet sending unit 802 is configured to construct a request packet for obtaining information about a DHCP client and send the request packet to a DHCP server, where the request packet may be generated by extending a DHCP Inform packet, and for details about a specific format of the extended packet, reference may be made to step 102 in Embodiment 1 of the present invention.

The packet receiving unit 804 receives, from the DHCP server, a response packet corresponding to the request packet, extracts the information about the client from the response packet, where the information about the client includes the client's IP address and MAC address, the response packet may be generated by extending DHCPACK, and for details about a specific format of the extended packet, reference may be made to step 104 in Embodiment 1 of the present invention.

The packet processing unit 806 obtains the client's virtual local area network VLAN number and ingress port number by looking up a MAC table by using the MAC address and generates the DHCP Snooping binding table according to the client's IP address, MAC address, VLAN number, and ingress port number.

The apparatus may further include a subnetwork setting unit 808 configured to set subnetwork information that is under DHCP Snooping monitoring by the network device. Accordingly, the request packet that is constructed by the packet sending unit for obtaining the information about the client includes the subnetwork information being monitored. The request packet may be an extension of the DHCP Inform packet. For details about a specific format of the extended packet, reference may be made to step 402 in Embodiment 2 of the present invention.

Optionally, the apparatus may further include a packet requesting unit and a packet processing unit.

The packet requesting unit is configured to construct the request packet, where the request packet includes the Dynamic Host Configuration Protocol inform (DHCP Inform) packet, the request packet is used to obtain the information about the DHCP client, the information about the client includes the client's IP address and MAC address, and for details about an extension to an option Options part of the DHCP Inform packet, reference may be made to step 102 in Embodiment 1 of the present invention.

The packet processing unit is configured to receive the response packet of the request packet, extract the information about the client, and further generate the DHCP Snooping binding table according to the obtained information about the client, where the response packet includes the Dynamic Host Configuration Protocol response DHCPACK packet and is generated by extending an option part of the DHCPACK, and for details about a specific format of the extended packet, reference may be made to step 104 in Embodiment 1 of the present invention.

Embodiment 4

Figure 9:
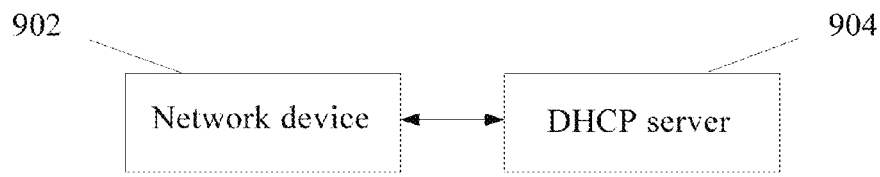
FIG. 9 is a schematic diagram of a system for generating a DHCP Snooping binding entry according to a fourth embodiment of the present invention.

The embodiment of the present invention provides a system for generating a DHCP Snooping binding table. Referring to FIG. 9, FIG. 9 is a schematic diagram of the system according to the embodiment of the present invention. The system includes: a network device 902 and a DHCP server 904.

The network device 902 is configured to construct a request packet for obtaining information about a DHCP client, send the request packet to a DHCP server, further receive, from the DHCP server, a response packet corresponding to the request packet, extract the information about the client from the response packet, and generate a DHCP Snooping binding table according to the information about the client.

The network device 902 preferably includes a packet sending unit 802, a packet receiving unit 804, and a packet processing unit 806. The packet sending unit 802 is configured to construct the request packet for obtaining the information about the client and send the request packet to the DHCP server, where the request packet may be generated by extending a DHCP Inform packet, and for details about a specific format of the extended packet, reference may be made to step 102 in Embodiment 1 of the present invention; the packet receiving unit 804 is configured to receive, from the DHCP server, the response packet corresponding to the request packet, where the response packet from the DHCP server may be generated by extending DHCPACK, and for details about a specific format of the extended packet, reference may be made to step 104 in Embodiment 1 of the present invention; and the packet processing unit 806 is configured to extract the information about the client from the response packet and generate the DHCP Snooping binding table according to the information about the DHCP client.

The network device may further include a subnetwork setting unit 808 configured to set subnetwork information that is under DHCP Snooping monitoring by the network device. Accordingly, the request packet that is constructed by the packet sending unit for obtaining the information about the client includes the subnetwork information being monitored. The request packet may be an extension to the DHCP Inform packet. For details about a specific format of the extended packet, reference may be made to step 402 in Embodiment 2 of the present invention.

Optionally, the network device may further include: a packet requesting unit and a packet processing unit.

The packet requesting unit is configured to construct the request packet, where the request packet includes the DHCP Inform packet, the request packet is used to obtain the information about the DHCP client, the information about the client includes the client's IP address and MAC address, and for details about an extension to an option Options part of the DHCP Inform packet, reference may be made to step 102 in Embodiment 1 of the present invention.

The packet processing unit is configured to receive the response packet of the request packet, extract the information about the client, and further generate the DHCP Snooping binding table according to the obtained information about the client, where the response packet includes the Dynamic Host Configuration Protocol response DHCPACK packet and is generated by extending an option part of the DHCPACK, and for details about a specific format of the extended packet, reference may be made to step 104 in Embodiment 1 of the present invention.

The DHCP server 904 is configured to receive the request packet sent by the network device, construct the response packet that includes the information about the client, and send the response packet to the network device.

It can be seen that according to the apparatus, network device, and system that are provided in the embodiments of the present invention, a DHCP Snooping binding table may be generated for a client that has established a connection with a DHCP server before DHCP Snooping is enabled, thereby solving the problem that traffic of some clients is lost due to a lack of a DHCP Snooping binding table of these clients in a process of enabling DHCP Snooping.

A person of ordinary skills in the art may understand that all or part of steps in the embodiments of the present invention may be implemented by a program instructing relevant hardware. The programs may be stored in a computer readable storage medium. When the programs run, the above steps of the methods in the embodiments are performed. The above storage medium includes various mediums capable of storing program code, such as a read-only memory (ROM), a random access memory (RAM), a magnetic disk or an optical disc.

Finally, it should be noted that the foregoing embodiments are merely intended for describing the technical solutions of the present invention rather than limiting the present invention. Although the present invention is described in detail with reference to the foregoing embodiments, a person of ordinary skill in the art should understand that they may still make modifications to the technical solutions described in the foregoing embodiments, or make equivalent replacements to some technical features thereof, without departing from the spirit and scope of the technical solutions of the embodiments of the present invention.

What is claimed is:

1. A method for generating a Dynamic Host Configuration Protocol (DHCP) snooping binding table, comprising:
   sending, by a network device, a DHCP Inform packet to a DHCP server, wherein the DHCP Inform packet requests an internet protocol (IP) address and a media access control (MAC) address of a DHCP client;
   receiving, from the DHCP server, a response packet responsive to the DHCP Inform packet;
   extracting the IP address and MAC address of the DHCP client from the response packet;
   obtaining a virtual local area network (VLAN) number and an ingress port number of the DHCP client from a MAC table using the MAC address; and
   generating a DHCP snooping binding entry based on the IP address, MAC address, VLAN number, and ingress port number of the DHCP client,
   wherein the DHCP Inform packet comprises a subnetwork address and a corresponding subnetwork mask, wherein the subnetwork address and the subnetwork mask identify a subnetwork being monitored by DHCP snooping and by the network device, wherein the IP address and the MAC address of the DHCP client in the response packet is within the subnetwork identified by the subnetwork address and the subnetwork mask, and wherein the DHCP client is a client that has established a connection with the DHCP server before DHCP snooping is enabled.

2. The method according to claim 1, wherein an Options part of the DHCP Inform packet comprises a packet type field that identifies that the request packet is the request packet for obtaining the IP address and the MAC address of the DHCP client.

3. The method according to claim 2, wherein the response packet is a DHCP response (DHCPACK) packet, and wherein an Options part of the DHCPACK packet comprises:
   a packet type field that identifies that the response packet is the response packet corresponding to the request packet;
   a DHCP client's IP address field that identifies the DHCP client's IP address; and
   a DHCP client's MAC address field that identifies the DHCP client's MAC address.

4. The method according to claim 1, wherein a default destination address of the DHCP Inform packet is 0XFFFFFFFF, and wherein the destination address of the DHCP Inform packet is a DHCP server address configured on the DHCP Relay when a DHCP Relay is configured.

5. A system for generating a Dynamic Host Configuration Protocol (DHCP) snooping binding table, wherein the system comprises:
   a network device; and
   a DHCP server in communication with the network device,
   wherein the network device is configured to:
      send a DHCP inform packet to the DHCP server, wherein the DHCP Inform packet requests an internet protocol (IP) address and a media access control (MAC) address of a DHCP client;
      receive, from the DHCP server, a response packet responsive to the DHCP Inform packet;
      extract the IP address and the MAC address of the DHCP client from the response packet; and
      generate a DHCP snooping binding entry based on the IP address the MAC address, VLAN number, and ingress port number of the of the DHCP client, obtaining a virtual local area network (VLAN) number and an ingress port number of the DHCP client from a MAC table using the MAC address; and
   wherein the DHCP server is configured to receive the DHCP Inform packet and construct the response packet responsive to the DHCP Inform packet,
   wherein the response packet comprises the IP address and the MAC address of the DHCP client,
   wherein the DHCP Inform packet comprises a subnetwork address and a corresponding subnetwork mask,
   wherein the subnetwork address and the subnetwork mask identify a subnetwork being monitored by DHCP snooping and by the network device,
   wherein the IP address and the MAC address of the DHCP client in the response packet is within the subnetwork identified by the subnetwork address and the subnetwork mask, and
   wherein the DHCP client is a client that has established a connection with the DHCP server before DHCP snooping is enabled.

6. The system according to claim 5, wherein the DHCP Inform packet comprises a subnetwork address and a corresponding subnetwork mask, wherein the subnetwork address and the subnetwork mask identify a subnetwork being monitored by DHCP snooping and by the network device, and wherein the DHCP server is configured to add only the IP address and the MAC address within the subnetwork identified by the subnetwork address and the subnetwork mask into the response packet.

7. A network device comprising a processor and a network interface, wherein the processor is configured to:
   send a Dynamic Host Configuration Protocol (DHCP) Inform packet to a DHCP server, wherein the DHCP Inform packetrequests an Internet Protocol (IP) address and a Media Access Control (MAC) address of a DHCP client using the network interface;
   receive a response packet responsive to the DHCP Inform packet from the DHCP server by using the network interface;
   extract the IP address and the MAC address of the DHCP client from the response packet;
   obtain a virtual local area network (VLAN) number and an ingress port number of the DHCP client from a MAC table using the MAC address; and
   generate a DHCP snooping binding entry based on the IP address, MAC address, VLAN number, and ingress port number of the DHCP client,
   wherein the DHCP Inform packet comprises a subnetwork address and a corresponding subnetwork mask, wherein the subnetwork address and the subnetwork mask identify a subnetwork being monitored by DHCP snooping and by the network device, wherein the IP address and the MAC address of the DHCP client in the response packet is within the subnetwork identified by the subnetwork address and the subnetwork mask, and wherein the DHCP client is a client that has established a connection with the DHCP server before DHCP snooping is enabled.

8. The network device according to claim 7, wherein the DHCP Inform packet comprises a subnetwork address and a corresponding subnetwork mask, wherein the subnetwork address and the subnetwork mask identify a subnetwork being monitored by DHCP snooping, and wherein the IP address and the MAC address of the DHCP client in the response packet is within the subnetwork identified by the subnetwork address and the subnetwork mask.

* * * * *

UNITED STATES PATENT AND TRADEMARK OFFICE
CERTIFICATE OF CORRECTION

PATENT NO. : 9,883,010 B2
APPLICATION NO. : 14/272613
DATED : January 30, 2018
INVENTOR(S) : Zhichong Han and Bin Yu Page 1 of 1

It is certified that error appears in the above-identified patent and that said Letters Patent is hereby corrected as shown below:

Column 12; Line 9; Claim 5 should read:
port number of the DHCP client, obtaining a Column 12; Line 43; Claim 7 should read:
Inform packet requests an Internet Protocol (IP) address Signed and Sealed this
Twenty-ninth Day of May, 2018

Andrei Iancu
*Director of the United States Patent and Trademark Office*